US008886996B2

(12) United States Patent
Yang et al.

(10) Patent No.: US 8,886,996 B2
(45) Date of Patent: Nov. 11, 2014

(54) DEBUGGING DEVICE AND METHOD FOR PERFORMING A DEBUGGING PROCESS TO A TARGET SYSTEM

(75) Inventors: Chih-Chung Yang, Taipei (TW);
Chun-Sheng Chen, Taipei (TW);
Hsin-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 340 days.

(21) Appl. No.: 13/436,998

(22) Filed: Apr. 2, 2012

(65) Prior Publication Data

US 2013/0262928 A1    Oct. 3, 2013

(51) Int. Cl.
*G06F 11/273* (2006.01)

(52) U.S. Cl.
USPC .............................................. 714/27; 714/30

(58) Field of Classification Search
CPC ............ G06F 11/2221; G06F 11/2733; G06F 11/3656
USPC .......................................................... 714/27
See application file for complete search history.

(56) References Cited

U.S. PATENT DOCUMENTS

| 6,151,653 A * | 11/2000 | Lin et al. ....................... 710/305 |
| 2004/0153811 A1 * | 8/2004 | Kuo .................................. 714/36 |
| 2005/0262285 A1 * | 11/2005 | Kang ............................. 710/315 |
| 2006/0010450 A1 * | 1/2006 | Culter ............................ 718/104 |
| 2006/0122748 A1 * | 6/2006 | Nou ................................. 701/29 |
| 2008/0072103 A1 * | 3/2008 | Lou .................................. 714/38 |
| 2009/0240852 A1 * | 9/2009 | Gou .................................. 710/63 |
| 2011/0271159 A1 * | 11/2011 | Ahn et al. ...................... 714/724 |
| 2012/0209447 A1 * | 8/2012 | Hortig et al. .................. 700/298 |
| 2012/0290246 A1 * | 11/2012 | Bhatnagar et al. ............. 702/122 |
| 2013/0009864 A1 * | 1/2013 | Jeong ............................. 345/156 |
| 2013/0207800 A1 * | 8/2013 | Vilela et al. ................... 340/501 |

FOREIGN PATENT DOCUMENTS

| CN | 202205197 U | * | 4/2012 |
| CN | 202433896 U | * | 9/2012 |
| EP | 1598743 A2 | * | 11/2005 |
| JP | 2000259448 A | * | 9/2000 |
| JP | 2011008568 A | * | 1/2011 |
| KR | 2007098155 A | * | 10/2007 |

* cited by examiner

*Primary Examiner* — Chae Ko
(74) *Attorney, Agent, or Firm* — CKC & Partners Co., Ltd.

(57) ABSTRACT

A debugging device for performing a debugging process through an electronic device external connector system is provided. The debugging device performs the debugging process to a target system, and the device comprises a first external connector, a switch, and a debugging module. The first external connector is connected to the external port of the target system. The switch is connected to the first external connector, and the switch chooses to activate the debugging process. The debugging module is connected to the switch, and the debugging module receives a universal asynchronous receiver/transmitter (UART) signal provided by the target system.

11 Claims, 6 Drawing Sheets

DEBUGGING DEVICE AND METHOD FOR PERFORMING A DEBUGGING PROCESS TO A TARGET SYSTEM

BACKGROUND

1. Field of Invention

The embodiment of the present invention relates generally to a basic electric element and, more particularly, to a debugging device and a method for performing a debugging process to a target system.

2. Description of Related Art

A conventional debug device is connected to a motherboard with an Industry Standard Architecture (ISA) interface, Peripheral Component Interconnect (PCI) interface, or PCI Express (PCI-E) interface. Hence, when a computer needs to be debugged, the case of the computer needs to be opened such that the conventional debug device can be connected to the motherboard.

However, the surface of the computer will be damaged during dismantling and assembling of the computer. Furthermore, costs are associated with the time to dismantle and assemble the computer. Moreover, when the BIOS (basic input/output system) of the motherboard malfunctions, the case of the computer also needs to be opened, and a particular apparatus is needed to recover the BIOS.

In summary, existing apparatuses and techniques still have obvious defects and need further improvement. In order to solve the above problems, those skilled in the art are endeavoring to find a solution, but no suitable method has been proposed.

SUMMARY

A debugging device and a method for performing a debugging process to a target system are provided, which address the problem of the surface of a computer being damaged during dismantling and assembling of the computer and which reduces costs associated with the time for dismantling and assembling the computer. Furthermore, with the use of the motherboard device, a USB device, and a method for operating the same, there is no need to recover the BIOS using a particular apparatus.

Thus, one aspect of the embodiment of the present invention is to provide a device for performing a debugging process to a target system, and the device comprises a first external connector, a switch, and a debugging module. The first external connector is connected to the external port of the target system, and the debugging device performs the debugging process to the target system through the first external connector. The switch is connected to the first external connector, and the switch chooses to activate the debugging process. The debugging module is connected to the switch, and the debugging module receives a universal asynchronous receiver/transmitter (UART) signal provided by the target system.

In one embodiment of the present invention, the debugging module comprises a display. The display comprises a decoding unit, and the decoding unit receives and decodes the UART signal through the switch to display a debug code on the display.

In another embodiment of the present invention, the debugging module comprises a transforming module. The transforming module receives the UART signal through the switch, and the UART signal is transformed by the transforming module.

In yet another embodiment of the present invention, the debugging module comprises a wireless transmission module. The wireless transmission module communicatively connected to the transforming module for wirelessly transmitting the UART signal to the remote monitoring device.

In still another embodiment of the present invention, the debugging module comprises a second external connector. The second external connector is connected to a remote control system, and the remote control system performs the debugging process to the target system by the device through the second external connector.

In yet another embodiment of the present invention, the debugging module comprises a recovering module. The recovering module comprises a serial peripheral interface (SPI) interface and is connected to the first external connector, and when a recovering process is activated, the recovering module transmits a recovering signal to the target system for performing the recovering process.

In another aspect of the embodiment of the present invention, a method for performing a debugging process to a target system through an electronic device external connector system is provided. The method comprises the steps of providing the electronic device external connector system; performing the debugging process to generate a debug code; transferring the debug code to the electronic device external connector system through the universal asynchronous receiver/transmitter (UART) interface of the target system; and providing a display for receiving and decoding the debug code to display the debug code.

In one embodiment of the present invention, the method further comprises the steps of providing a transforming module for receiving the debug code, wherein the debug code is transformed by the transforming module.

In another embodiment of the present invention, the method further comprises the steps of performing the debugging process to the target system by control of a remote control system.

In yet another embodiment of the present invention, the method further comprises the steps of providing a recovering module, wherein when a recovering process is activated, the recovering module transmits a recovering signal to the target system for performing the recovering process.

In yet another embodiment of the present invention, the method further comprises the steps of wirelessly transmitting the debug code to a remote monitoring device.

In summary, the embodiments of the present invention provide the debugging device and the method for performing the debugging process to the target system, which address the problem of the surface of the computer being damaged during dismantling and assembling of the computer and which reduces costs associated with the time for dismantling and assembling the computer.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
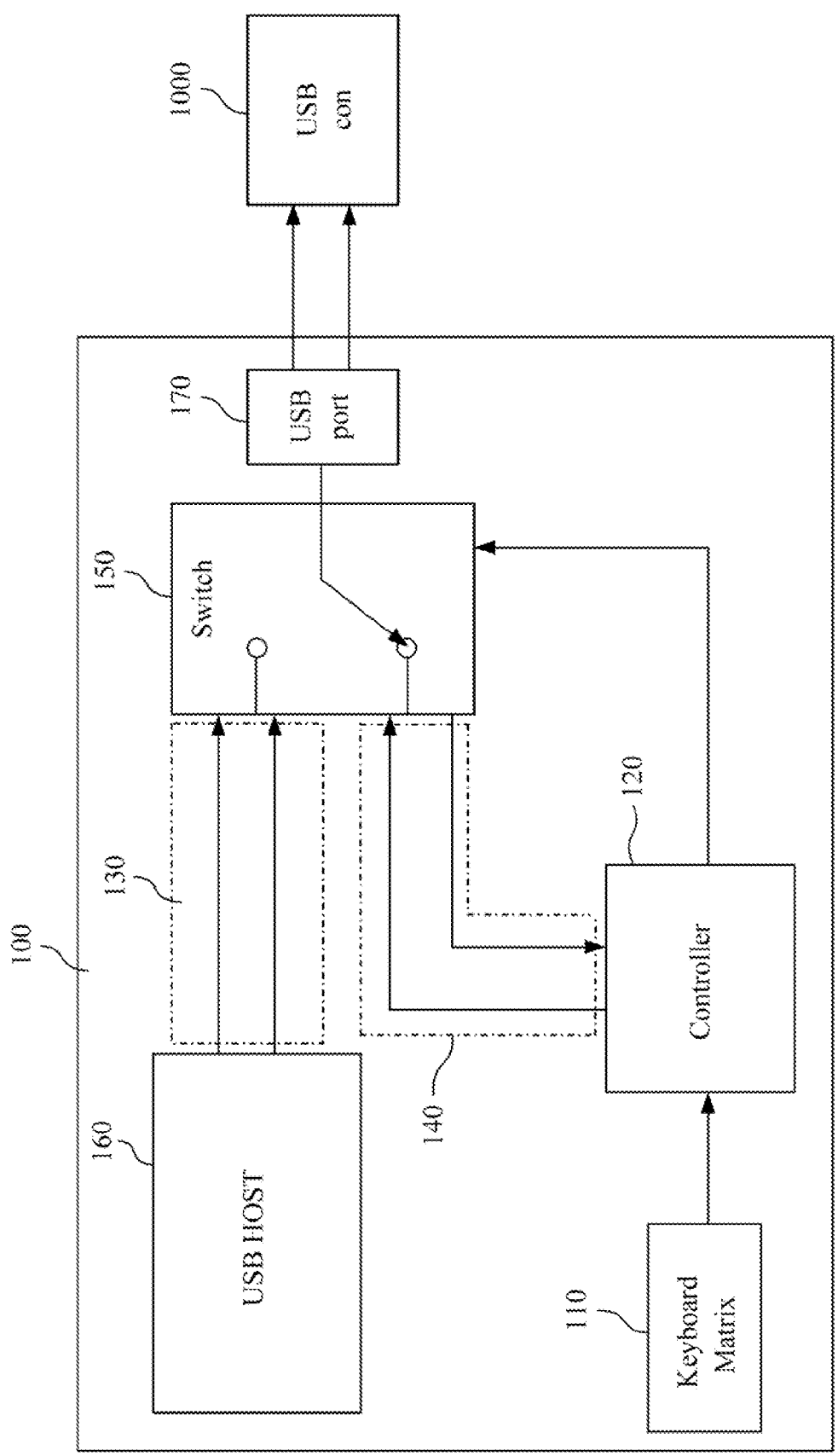
FIG. 1 schematically shows a block diagram of a motherboard device according to embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views.

FIG. 1 schematically shows a block diagram of a motherboard device 100 according to embodiments of the present invention.

As shown in FIG. 1, the motherboard device 100 comprises a keyboard matrix 110, a controller 120, a universal serial bus (USB) pin 130, a debug pin 140, a switch 150, a USB host 160, and a USB port 170. The motherboard device 100 can be configured to operate in one of a USB mode and a debug mode by control of the switch 150.

In operation, when a hot key of the keyboard matrix 110 is pressed, a command is generated from the keyboard matrix 110 for choosing one of the USB mode and the debug mode. The controller 120 receives and processes the command to generate a control signal. The switch 150 receives the control signal, and the switch 150 is connected to one of the USB pin 130 and the debug pin 140 based on the control signal.

When the switch 150 is connected to the USB pin 130, the motherboard device 100 operates in the USB mode such that data is transmitted from the USB host 160 to the USB port 170 through the USB pin 130 and the switch 150.

When the switch 150 is connected to the debug pin 140, the motherboard device 100 operates in the debug mode such that a debug signal is transmitted from the controller 120 to the USB port 170 through the debug pin 140 and the switch 150.

Furthermore, the USB port 170 is electrically connected to the switch 150 and is configurable to connect with a USB connection 1000 such that a USB device with the USB connection 1000 can receive data or the debug signal from the USB port 170 of the motherboard device 100.

In one embodiment of the present invention, the debug signal comprises a universal asynchronous receiver/transmitter (UART) debug signal. In addition, the controller 120 can be an embedded controller or a keyboard controller. However, the present invention is not limited in this regard. For example, those skilled in the art can selectively adopt appropriate electronic element for use as the controller, depending on actual requirements.

Figure 2:
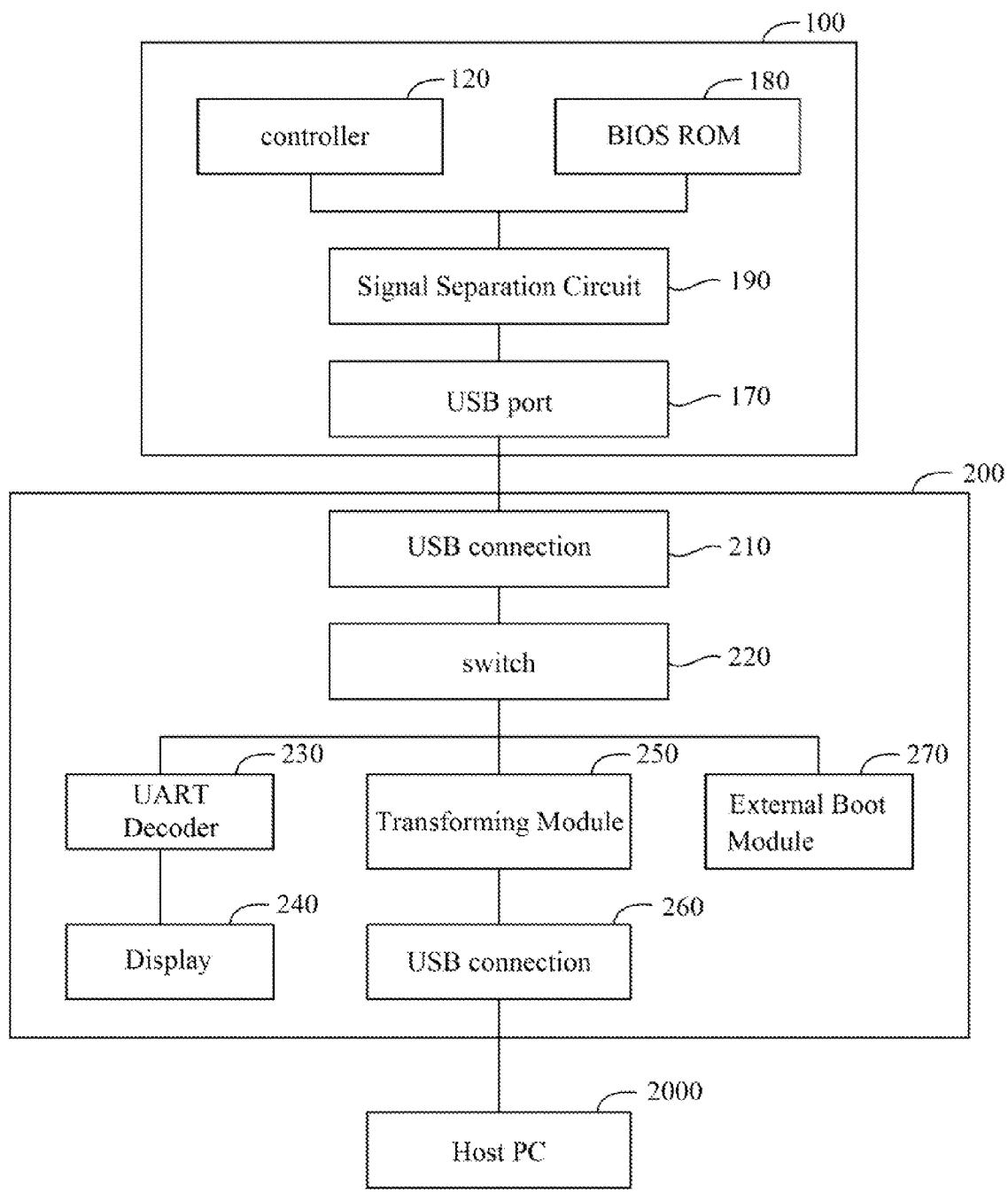
FIG. 2 schematically shows a block diagram of a motherboard device and a universal serial bus (USB) device according to embodiments of the present invention.

FIG. 2 schematically shows a circuit block diagram of the motherboard device 100 and a USB device 200 according to embodiments of the present invention.

Compared with FIG. 1, the motherboard device 100 further comprises a BIOS read-only memory (ROM) 180 and a signal separation circuit 190. Since the controller 120 is connected to the USB port 170 with a universal asynchronous receiver/transmitter (UART) interface and the BIOS ROM 180 is connected to the USB port 170 with a serial peripheral interface (SPI) interface, the signal separation circuit 190 is used to switch to the USB signal or the UART signal according to the actual requirements.

As shown in FIG. 2, the USB device 200 comprises an USB connection 210, a switch 220, a UART decoder 230, a display 240, a transforming module 250, a USB connection 260, and an external boot module 270.

The USB connection 210 is connected to the USB port 170, and a debug signal is transmitted to the USB device 200 through the USB connection 210. The switch 220 is electrically connected to the USB connection 210 and receives a control signal. The switch 220 is connected to one of the display 240, the transforming module 250, and the external boot module 270 based on the control signal. In one embodiment, the switch 220 is connected to the display 240 through the UART decoder 230.

As mentioned above, the debug signal can be a universal asynchronous receiver/transmitter (UART) debug signal, and moreover, the display 240 can be a seven-segment display, and the switch 220 can be a dip switch. However, with respect to the display 240 and the switch 220, the present invention is not limited in this regard, and those skilled in the art can selectively adopt appropriate electronic element for use as the display 240 and the switch 220, depending on actual requirements.

When the switch 220 is connected to the display 240 through the UART decoder 230, the UART decoder 230 receives and decodes the UART debug signal to generate a decoded debug signal. The display 240 receives and processes the decoded debug signal to display a debug code on the display 240. The debug code displayed on the display 240 indicates which element of the computer is malfunctioning.

When the switch 220 is connected to the transforming module 250, the transforming module 250 receives the debug signal through the switch 220 and transmits the debug signal to a remote monitoring device.

In the embodiment, the transforming module 250 can be a UART to USB transforming module, and the remote monitoring device can be a Host PC 2000. The UART to USB transforming module transfers the UART debug signal into a USB debug signal and transmits the USB debug signal to the Host PC 2000 through the USB connection 260. However, the present invention is not limited in this regard, and those skilled in the art can selectively adopt appropriate devices for use as the transforming module 250 and the remote monitoring device, depending on actual requirements.

When a computer cannot be turned on, it is necessary to determine whether the BIOS is malfunctioning or the computer is experiencing other problems. If the BIOS is malfunctioning, the BIOS can be recovered by the external boot module 270 of the USB device 200.

Hence, the switch 220 is connected to the external boot module 270 for determining if the BIOS is malfunctioning. When the motherboard device 100 of the computer can be turned on through the USB port 170 by the external boot module 270, the BIOS is malfunctioning and can be recovered. At this time, the external boot module 270 recovers the BIOS of the motherboard device 100 of the computer through the USB port 170.

Figure 3:
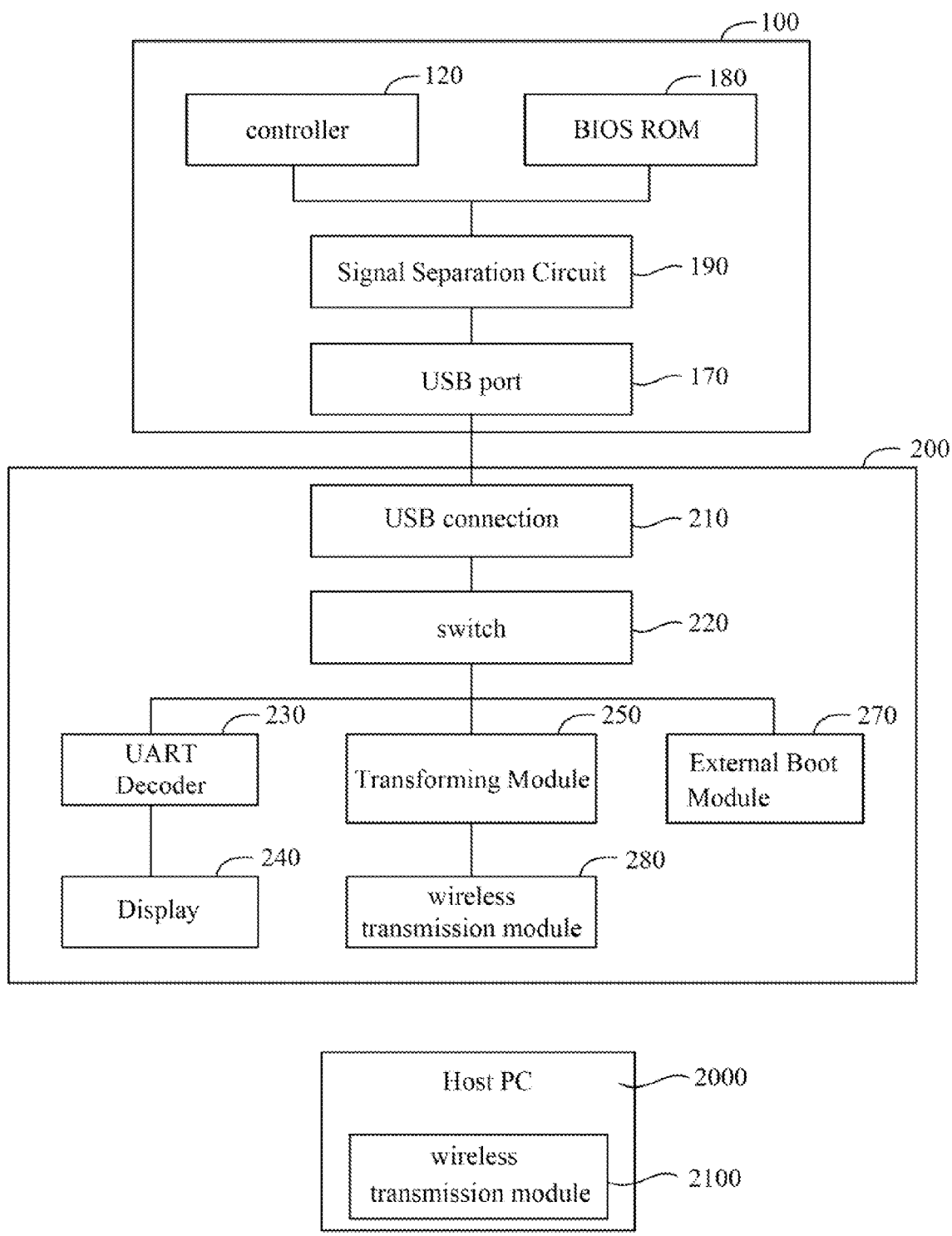
FIG. 3 schematically shows a block diagram of a motherboard device and a USB device according to embodiments of the present invention.

FIG. 3 schematically shows a block diagram of the motherboard device 100 and the USB device 200 according to embodiments of the present invention.

Compared with FIG. 2, the USB device 200 further comprises a wireless transmission module 280 for wirelessly transmitting the debug signal, and the Host PC 2000 can further comprise a wireless transmission module 2100 for wirelessly receiving the debug signal.

Figure 4:
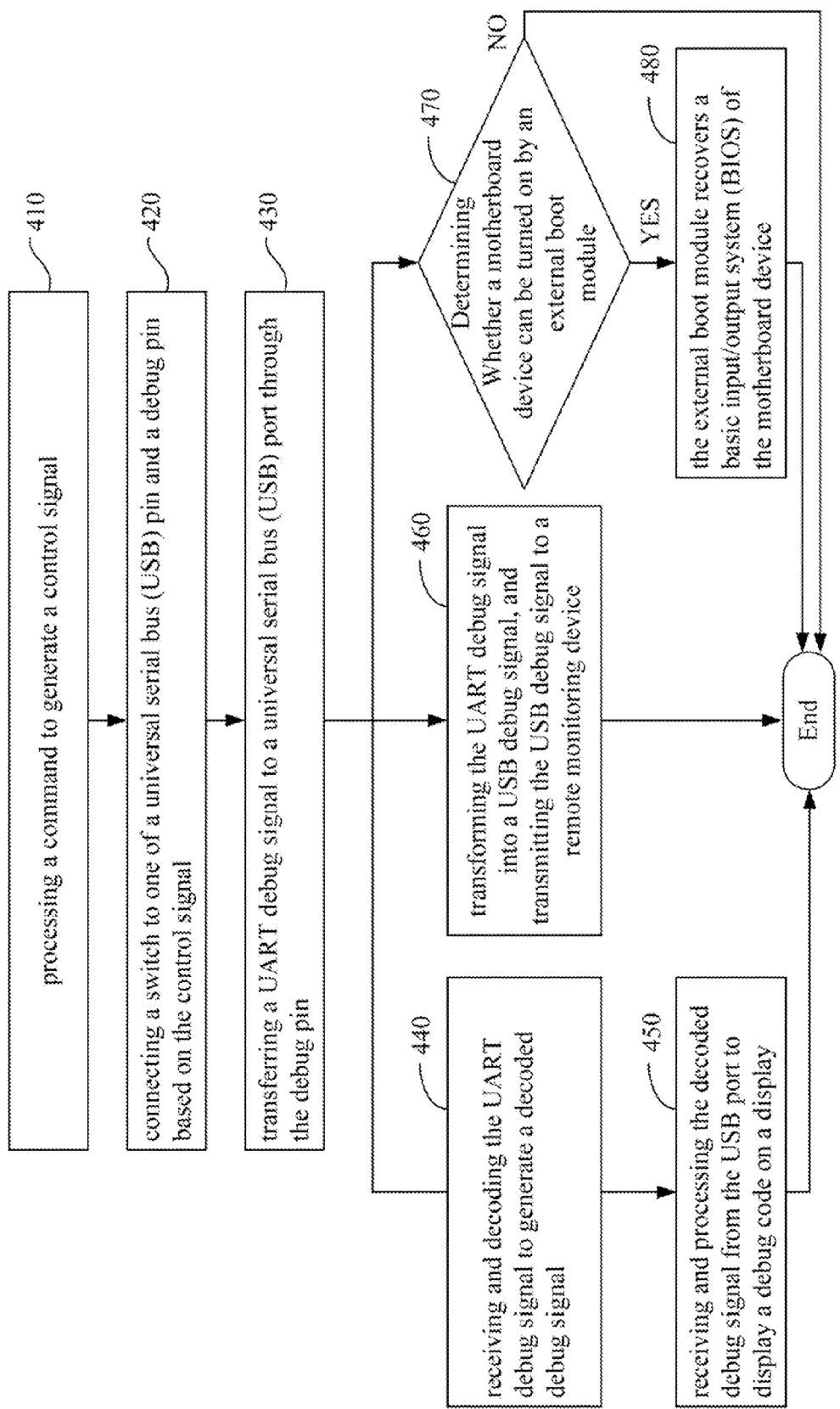
FIG. 4 schematically shows a flow diagram of a method for operating a motherboard device and a USB device according to embodiments of the present invention.

FIG. 4 schematically shows a flow diagram of a method 400 for operating a motherboard device and a USB device according to embodiments of the present invention.

As shown in FIG. 4, the method 400 for operating the motherboard device and the USB device comprises the steps of processing a command to generate a control signal (step 410), connecting a switch to one of a USB pin and a debug pin based on the control signal (step 420), and transferring a UART debug signal to a USB port through the debug pin (step 430).

Reference is now made to both FIGS. 1, 2 and FIG. 4. In step 410, the controller 120 can be implemented to process the command to generate the control signal. In an optional embodiment, the command can be generated by pressing the hot key of the keyboard matrix 110.

In step 420, the switch 150 can be connected to one of the USB pin 130 and the debug pin 140 based on the control signal for choosing the USB mode or the debug mode. When the switch 150 is connected to the debug pin 140, the debug mode is chosen such that a debug signal is transmitted from the controller 120 to the USB port 170 through the debug pin 140 and the switch 150.

Moreover, the method 400 for operating the motherboard device and the USB device further comprises the steps of receiving and decoding the UART debug signal to generate a decoded debug signal (step 440), and receiving and processing the decoded debug signal from the USB port to display a debug code on a display (step 450).

Referring to step 440, the UART decoder 230 can be implemented to receive and decode the UART debug signal to generate a decoded debug signal. In step 450, the display 240 can be implemented to receive and process the decoded debug signal from the USB port 170 to display the debug code on the display 240.

The method 400 for operating the motherboard device and the USB device further comprises the steps of transforming the UART debug signal into a USB debug signal, and transmitting the USB debug signal to a remote monitoring device (step 460).

In step 460, the transforming module 250 can be implemented to transfer the UART debug signal into a USB debug signal and transmit the USB debug signal to a remote monitoring device.

In one embodiment, the debug signal can be transmitted in a wirelessly. The wireless transmission module 280 in FIG. 3 can be used to wirelessly transmit the debug signal to the remote monitoring device.

Furthermore, the method 400 for operating the motherboard device and the USB device further comprises the steps of determining whether a motherboard device can be turned on by an external boot module (step 470), and the external boot module recovering a basic input/output system (BIOS) of the motherboard device (step 480).

Referring to step 470, the external boot module 270 can be implemented to turn on the motherboard device 100. If the motherboard device 100 can be turned on by the external boot module 270, step 480 is executed for recovering BIOS of the motherboard device 100 by the external boot module 270.

It is noted that there is a step before step 440, step 460, and step 470, and this step is performed to choose one of step 440, step 460, and step 470. Said step can be performed by the switch 220 to choose which subsequent step is to be executed.

Figure 5:
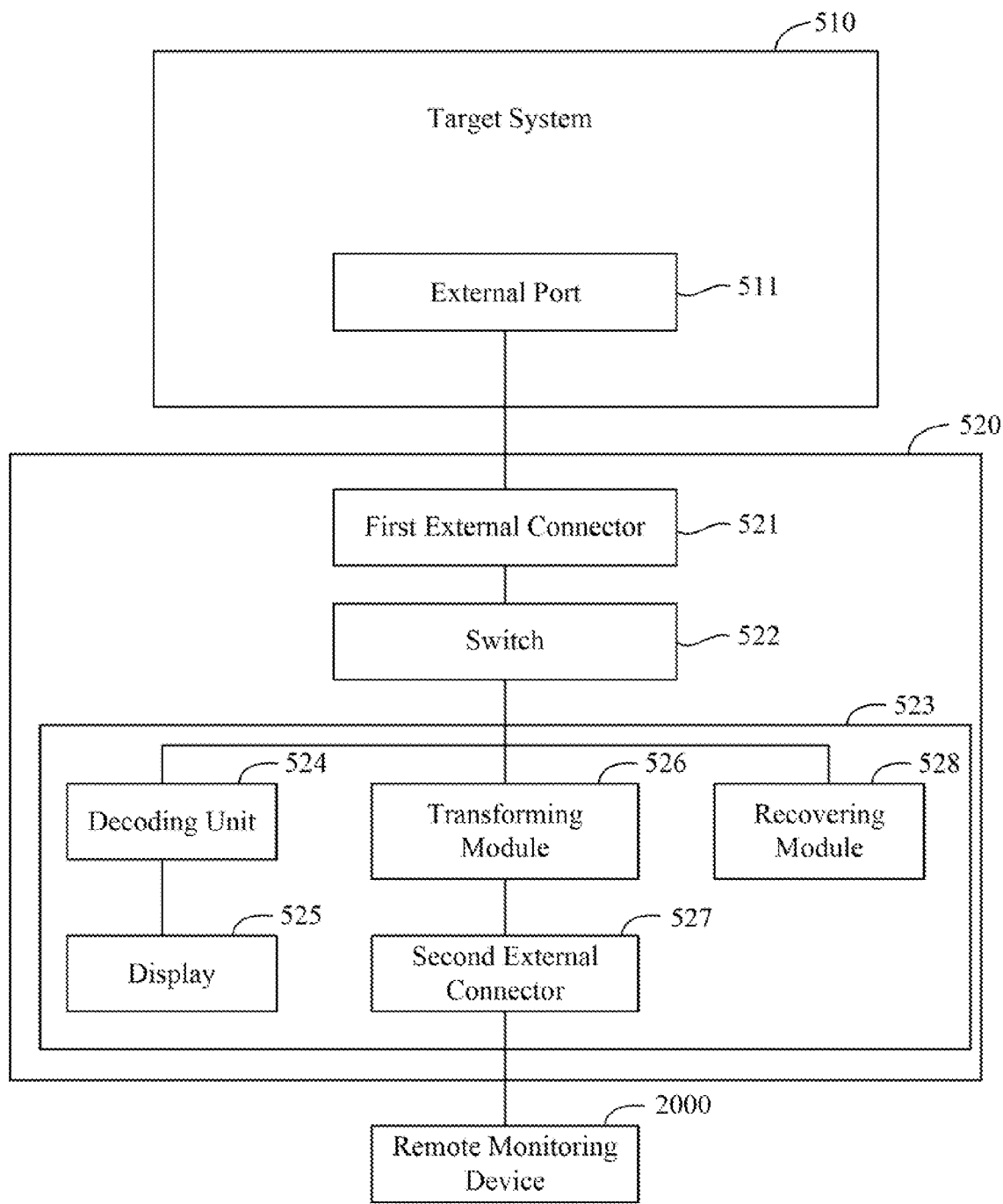
FIG. 5 schematically shows a block diagram of a debugging device for performing a debugging process to a target system according to embodiments of the present invention.

FIG. 5 schematically shows a block diagram of a debugging device 520 for performing a debugging process to a target system 510 according to embodiments of the present invention.

Reference is now made to FIG. 5, the debugging device 520 is used to perform the debugging process to the target system 2000. The device 520 comprises a first external connector 521, a switch 522, and a debugging module 523.

As mentioned-above, the first external connector 521 is connected to the external port 511 of the target system 510, and the debugging device 520 performs the debugging process to the target system 2000 through the first external connector 521. The switch 522 is connected to the first external connector 521, and the switch 522 chooses to activate the debugging process. The debugging module 523 is connected to the switch 521, and the debugging module 523 receives a universal asynchronous receiver/transmitter (UART) signal provided by the target system 510.

In one embodiment of the present invention, the debugging module 523 comprises a display 525. The display 525 comprises a decoding unit 524, and the decoding unit 524 receives and decodes the UART signal through the switch 522 to display a debug code on the display 525.

In another embodiment of the present invention, the debugging module 523 further comprises a transforming module 526. The transforming module 526 receives the UART signal through the switch 522, and the UART signal is transformed by the transforming module 526.

In yet another embodiment of the present invention, the debugging module 523 further comprises a wireless transmission module (not shown). The wireless transmission module communicatively connected to the transforming module 526 for wirelessly transmitting the UART signal to the remote monitoring device 2000.

In still another embodiment of the present invention, the debugging module 523 further comprises a second external connector 527. The second external connector 527 is connected to the remote control system 2000, and the remote control system 2000 performs the debugging process to the target system 510 by the device 520 through the second external connector 527.

In yet another embodiment of the present invention, the debugging module 523 further comprises a recovering module 528. The recovering module 528 comprises a serial peripheral interface (SPI) and is connected to the first external connector 521, and when a recovering process is activated, the recovering module 528 transmits a recovering signal to the target system 510 for performing the recovering process.

Figure 6:
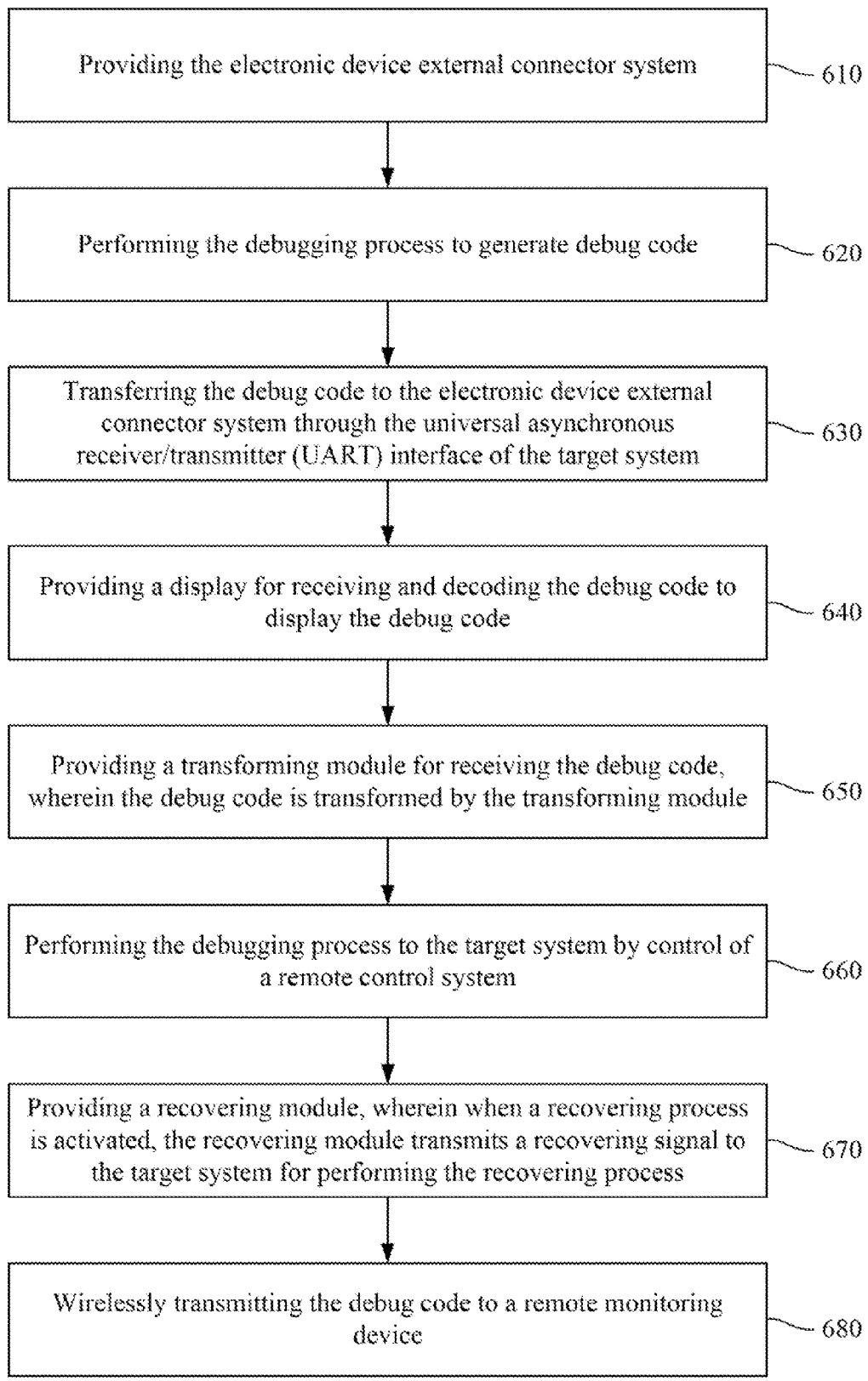
FIG. 6 schematically shows a flow diagram of a method for performing a debugging process to a target system through an electronic device external connector system according to embodiments of the present invention.

FIG. 6 schematically shows a flow diagram of a method for performing a debugging process to a target system through an electronic device external connector system according to embodiments of the present invention.

As shown in FIG. 6, the method performs a debugging process to a target system, and the method comprises the steps of providing the electronic device external connector system (step 610); performing the debugging process to generate a debug code (step 620); transferring the debug code to the electronic device external connector system through the universal asynchronous receiver/transmitter (UART) interface of the target system (step 630); and providing a display for receiving and decoding the debug code to display the debug code (step 640). Reference is now made to both FIG. 5 and FIG. 6. In step 610, the electronic device external connector system is provided, then the method can perform the debugging process through the electronic device external connector system. In one embodiment, the electronic device external connector system can be a USB port.

Referring to step 620, the debugging device 520 can be implemented to perform the debugging process to generate a debug code. In step 630, the debugging device 520 can be implemented to transfer the debug code to the electronic device external connector system through the UART interface of the target system 510. In step 640, the display 525 is provided to receive and decode the debug code to display the debug code.

In one embodiment of the present invention, the method further comprises the steps of providing a transforming module for receiving the debug code, wherein the debug code is transformed by the transforming module (step 650).

In step 650, the debug code can be a UART debug signal, and the transforming module 526 can be implemented to transform the UART debug signal into a USB debug signal and transmit the USB debug signal to a remote monitoring device 2000.

In another embodiment of the present invention, the method further comprises the steps of performing the debugging process to the target system by control of a remote control system (step 660).

Referring to step 660, the user can operate the remote control system 2000 to perform the debugging process to the target system 510.

In yet another embodiment of the present invention, the method further comprises the steps of providing a recovering module, wherein when a recovering process is activated, the recovering module transmits a recovering signal to the target system for performing the recovering process (step 670).

In step 670, when a user chooses the recovering process, the recovering module 528 can be implemented to transmit a recovering signal to the target system 510 for performing the recovering process.

In yet another embodiment of the present invention, the method further comprises the steps of wirelessly transmitting the debug code to a remote monitoring device (step 680).

Referring to step 680, the wireless transmission module can be used to wirelessly transmit the debug signal to the remote monitoring device 2000.

Those having skill in the art will appreciate that the method for operating the motherboard device and the USB device can be performed with software, hardware, and/or firmware. For example, if a designer determines that speed and accuracy are paramount, the designer may opt for a mainly hardware and/or firmware implementation; alternatively, if flexibility is paramount, the designer may opt for a mainly software implementation; or, yet again alternatively, the designer may opt for some combination of hardware, software, and/or firmware. Those skilled in the art will recognize that optical aspects of implementations will typically employ optically oriented hardware, software, and or firmware.

In addition, those skilled in the art will appreciate that aspects of each of the steps of the method for operating the motherboard device and the USB device described after the naming of the main function of each of the steps are merely used to describe the technology in the embodiment of the present invention in detail but should not be limited thereto. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiment of the present invention provides the debugging device and the method for performing the debugging process to the target system, which address the problem of the surface of the computer being damaged during dismantling and assembling process of the computer and which reduces costs associated with the time for dismantling and assembling the computer. Furthermore, with the use of the motherboard device, a USB device, and a method for operating the same, there is no need to recover the BIOS using a particular apparatus.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A debugging device for performing a debugging process to a target system, wherein the device comprises:
   a first external connector connected to the external port of the target system, wherein the debugging device performs the debugging process to the target system through the first external connector;
   a switch connected to the first external connector, wherein the switch chooses alternatively between activating the debugging process and activating a data transmitting process; and
   a debugging module connected to the switch, wherein the debugging module receives a universal asynchronous receiver/transmitter (UART) signal provided by the target system.

2. The debugging device according to claim 1, wherein the debugging module comprises:
   a display comprising a decoding unit, wherein the decoding unit receives and decodes the UART signal through the switch to display a debug code on the display.

3. The debugging device according to claim 1, wherein the debugging module comprises:
   a transforming module for receiving the UART signal through the switch, wherein the UART signal is transformed by the transforming module.

4. The debugging device according to claim 3, wherein the debugging module comprises:
   a wireless transmission module communicatively connected to the transforming module for wirelessly transmitting the UART signal to the remote monitoring device.

5. The debugging device according to claim 1, wherein the debugging module comprises:
   a second external connector connected to a remote control system, wherein the remote control system performs the debugging process to the target system by the device through the second external connector.

6. The debugging device according to claim 1, wherein the debugging module comprises:
   a recovering module comprising a serial peripheral interface (SPI) interface and connected to the first external connector, wherein when a recovering process is activated, the recovering module transmits a recovering signal to the target system for performing the recovering process.

7. A method for performing a debugging process to a target system through an electronic device external connector system, wherein the method comprises:
   providing the electronic device external connector system;
   processing a command to generate a control signal;

connecting a switch to one of a USB pin and a debug pin based on the control signal, wherein a debug mode is chosen when the switch is connected to the debug pin;

transferring a UART debug signal to a USB port through the debug pin:

performing the debugging process to generate a debug code;

transferring the debug code to the electronic device external connector system through the universal asynchronous receiver/transmitter (UART) interface of the target system; and providing a display for receiving and decoding the debug code to display the debug code.

8. The method according to claim 7, further comprising:

providing a transforming module for receiving the debug code, wherein the debug code is transformed by the transforming module.

9. The method according to claim 7, further comprising:

performing the debugging process to the target system by control of a remote control system.

10. The method according to claim 7, further comprising:

providing a recovering module, wherein when a recovering process is activated, the recovering module transmits a recovering signal to the target system for performing the recovering process.

11. The method according to claim 7, further comprising:

wirelessly transmitting the debug code to a remote monitoring device.

* * * * *